United States Patent Office 3,383,058
Patented May 14, 1968

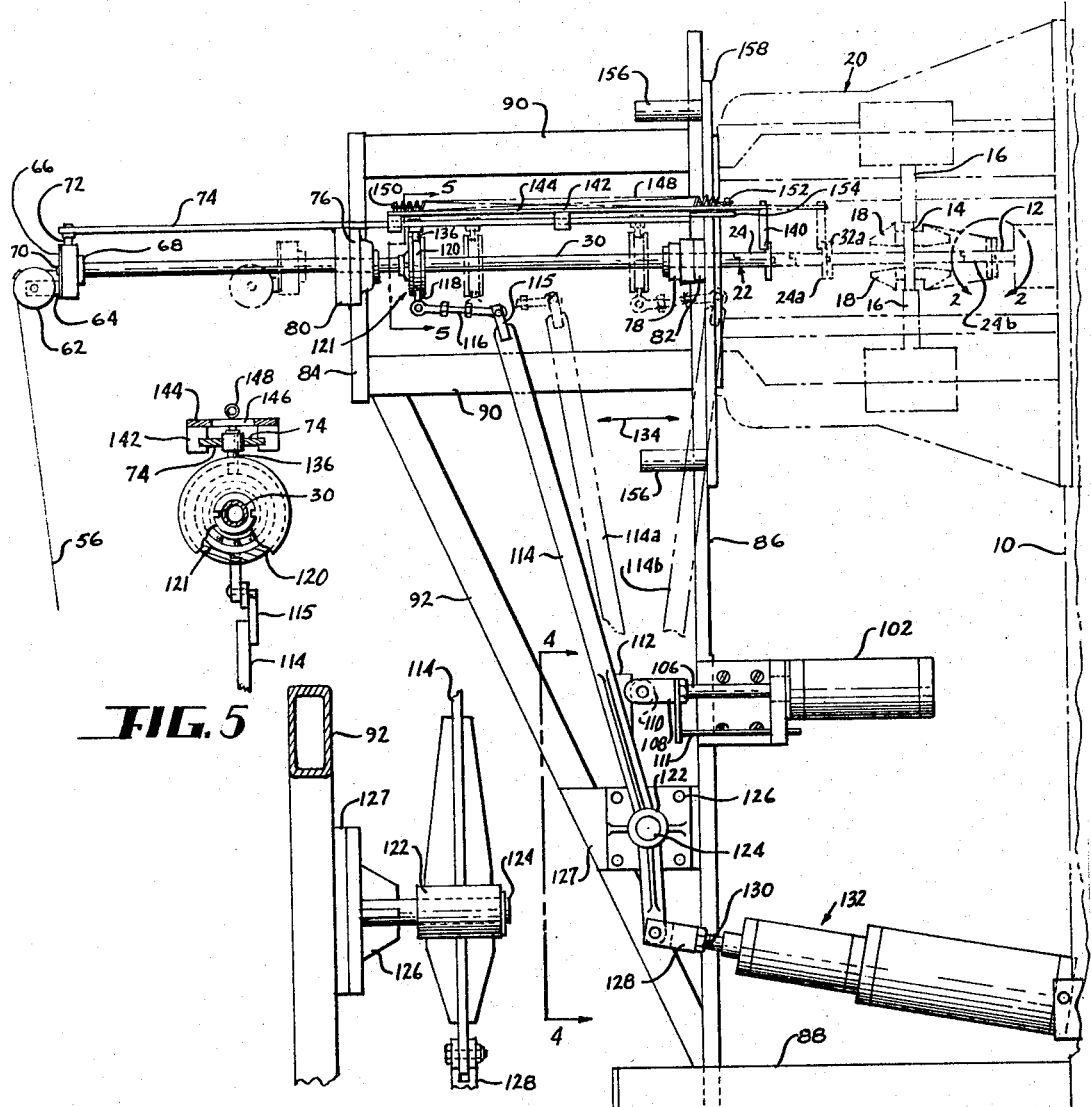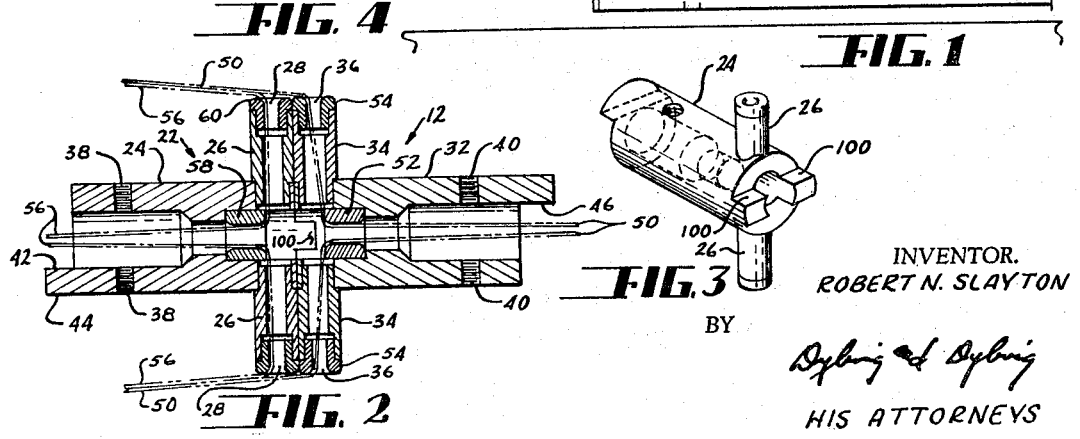

3,383,058
STATOR WINDING MACHINE
Robert N. Slayton, Enon, Ohio, assignor to The Globe Tool and Engineering Company, Dayton, Ohio, a corporation of Ohio
Filed June 24, 1966, Ser. No. 560,131
10 Claims. (Cl. 242—1.1)

This invention relates to a stator winding machine and more particularly to a machine for winding compound field coils on inwardly directed pole pieces of stator frames. As will become apparent, the invention is not necessarily so limited.

Stator coils having inwardly directed pole pieces are commonly wound with field coils by shuttle mechanisms so arranged as to reciprocate through slots between adjacent pole pieces and oscillate between the slots at each end of the reciprocatory movement. The shuttles may have two or more wire outlets for winding two or more coils simultaneously depending upon the electrical requirements for the stator. As few as two coils may be required, one for each of two poles, or a greater number of coils may be required which will be wound in various patterns on the stator core. As an example, each pole may have a central coil and a plurality of additional coils each straddling a greater arc of the stator core.

Regardless of the number of coils required, the electrical requirements of the stator may be such that some or all of the coils need be compound coils. That is, the wire wound in a pair of stator slots or around a given stator pole piece forms two or more coils. Typically, one coil is wound from heavier wire than the other. Sometimes it is desired that one or more coils of a compound coil have a greater number of turns of wire than the remaining coils. If the compound coil comprises two coils having the same number of turns, the usual shuttle mechanism can be used but difficulty is often encountered, especially if one wire is of a greater diameter than the other, because one of the wires may be pinched between the other wire and the shuttle outlet whereupon the wires or their insulation are damaged. Of course, the normal shuttle mechanism cannot be used in a single cycle to wind compound coils involving two sets of windings, one having a greater number of turns that the other.

An object of this invention is to provide an improved shuttle mechanism especially adapted for the winding of compound coils on stator cores. More specifically, objects of this invention are to provide for the simultaneous winding of heavy and fine wire into field coils without interference between the two wires and to permit the simultaneous winding of field coils having different numbers of turns in a single winding cycle.

A further object of this invention is to provide an adapter for conventional shuttle winding mechanisms for attachment thereto to accomplish the objects set forth above.

Still another object of this invention is to provide an auxiliary shuttle for a stator winding machine which is driven by the main shuttle drive mechanism.

Still another object of this invention is to provide for the simultaneous winding of more wires than can be conveniently accomplished with a conventional shuttle winding mechanism.

Other objects and advantages will become apparent from the following description.

Referring to the drawings:

FIGURE 1 is a side elevational view of apparatus made in accordance with this invention shown connected to the front face of a conventional shuttle-type stator winding machine. The portion of the stator winding machine illustrated in FIGURE 1 is shown in phantom lines.

FIGURE 2 is a cross-sectional view of a pair of shuttle heads in accordance with this invention taken from the portion of FIGURE 1 encircled by the line 2—2.

FIGURE 3 is a perspective view of an auxiliary shuttle head which is also illustrated in cross-section in FIGURE 2.

FIGURE 4 is a front elevational view, with portions in cross-section, of part of an operating mechanism for the auxiliary shuttle as viewed in the direction of arrows 4—4 of FIGURE 1.

FIGURE 5 is a cross-sectional view of a portion of the operating mechanism taken along line 5—5 of FIGURE 1.

Referring in greater detail to the drawing, the front face of a stator winding machine, generally designated 10, is shown to the right side of FIGURE 1. The machine 10 includes a shuttle 12 for winding coils around inwardly directed pole pieces of a stator frame or core 14 supported in a mounting ring 16. The machine 10 may include winding forms or horns 18 such as shown in United States Patent Re. 25,281, issued to Harry W. Moore on Nov. 6, 1962. Associated structure generally designated 20 mounted on the front face of the machine 10 serves to support the winding forms 18 and to control the position thereof with respect to the stator frame 14 being provided with coils. It is to be understood that the machine can be entirely conventional but for a modification of the shuttle 12 to be discussed below and it is only important for purposes of this invention that the machine 10 be provided with a shuttle 12 which is driven to reciprocate and oscillate about a predetermined axis to wind coils about stator pole pieces and that some mechanism is provided to support a stator frame in appropriate position to receive coils. The stator winding machine 10 may be of the type commercially known as Model No. MSW1A sold by the Globe Tool and Engineering Company of Dayton, Ohio. Examples of drive mechanisms for shuttles such as the shuttle 12 are shown in United States Patent No. 3,251,559 issued to Harry W. Moore on May 17, 1966, and in United States Patent No. 3,052,418 issued to Harry J. Gorski et al. on Sept. 4, 1962.

Because the shuttle 12 can be used by itself to wind a field coil, or in any event would normally be used to wind the main or basic coil of a compound coil, the shuttle 12 will hereinafter be referred to as the "main" shuttle. In accordance with this invention, an auxiliary shuttle, generally designated 22, is provided for winding an additional wire or wires synchronously and simultaneously with the wires wound by the main shuttle 12. With reference to FIGURES 1 and 2, the auxiliary shuttle 22 includes a shuttle head 24 upon which is mounted a pair of shuttle pins 26 having wire outlets 28. The shuttle 22 further includes a hollow rod or spindle 30 which is mounted for reciprocatory and oscillatory movement as will be described below. In FIGURE 2 it will be noted that the shuttle head is substantially identical to a shuttle head 32 forming part of the main shuttle 12 and carrying a pair of shuttle pins 34 having wire outlets 36. As will be appreciated by those skilled in the art, the position of the shuttle heads 24 and 32 on their respective spindles must be accurately predetermined and for this reason each of the shuttle heads 24 and 32 is provided with threaded apertures 38 and 40, respectively, for receiving locking screws (not shown) for attaching the shuttle heads to their respective spindles. Also, the auxiliary shuttle head 24 has a flat 42 formed on a flange 44 adapted to mate with a cooperating flat surface (not shown) on the spindle 30 for accurately aligning the shuttle head 24 with respect to the spindle 30. The main shuttle head 32 is similarly provided with a flat 46 for the same purpose.

Two strands of wire, designated 50, are shown coursed through the main shuttle 12 in FIGURE 2 and passing around a bearing insert or outlet 52 in the main shuttle head 32 and out the wire outlets 36 which, to protect the wire, are provided with bearing tips 54. As is well known, the wire strands 50 come from wire spools (not shown) normally located to the rear of the machine 10 and pass through the shuttle 12. Similarly, wire strands 56 are illustrated in FIGURE 2 passing through the shuttle head 24 around a bearing insert or eyelet 58 and through bearing tips 60 at the wire outlets 28. In the case of the auxiliary shuttle 22, as viewed in FIGURE 1, the wire strands 56 coming from wire spools (not shown) are coursed around pulleys 62 mounted by brackets 64 on a cup-shaped member 66 which is mounted by ball bearings or the like on a collar 68 affixed to the end of the spindle 30. The rear face of the cup-shaped member 66 has a restricted aperture defined by a small sleeve 70 through which the wire strands 56 are coursed. In FIGURE 1 only one wire strand 56 and one pulley 62 are illustrated but it will be appreciated that there will be two pulleys 62 if two wire strands 56 are required. Generally, there will be as many pulleys as there are wire strands passing into the spindle 30 of the auxiliary shuttle 22. The cup-shaped member 66 which serves with the pulley 62 to form a wire-collecting assembly at the rearmost end of the auxiliary spindle 30 reciprocates with the spindle 30. The wire 56 leading to the spindle 30 would be fouled if the wire-collecting assembly 62 through 70 oscillated with the auxiliary spindle 30. To avoid such oscillatory movement, the cup-shaped member 66 is provided with a guide pin 72 projecting upwardly into a slot (not shown) formed between a pair of elongated guide plates 74 attached to a framework supporting the auxiliary shuttle 22 to be described below.

With continued reference to FIGURE 1, the auxiliary spindle 30 is mounted for sliding or reciprocating and oscillating movement within a pair of spaced bearings 76 and 78 mounted on support plates or brackets 80 and 82 which project horizontally from a pair of generally vertically oriented frame pieces 84 and 86, respectively. The frame piece 86 extends vertically for substantially the entire height of the machine 10 and its lower end is mounted upon a support bracket 88 which may be connected to the base of the machine 10. The frame piece 84 is supported in spaced, parallel relation to the frame piece 86 by a pair of support arms 90. The framework for supporting the auxiliary shuttle 22 further may include a brace 92 connected between the outermost or rearmost end of the lower support arm 90 and the lower end portion of the main frame piece 86. From the foregoing, it will be appreciated that the bearings 76 and 78 are supported in fixed spaced relation by the various frame members of machine 10. They may be provided with conventional low friction bearing sleeves (not shown) with respect to which the spindle 30 oscillates and reciprocates. The aforementioned guide plates 74 can be connected, such as by welding, to the top edges of the support brackets 80 and 82.

In accordance with this invention, the auxiliary shuttle 22 is placed into operation merely by moving it into engagement with the main shuttle 12. Thus, no independent oscillatory or reciprocatory drive is required for the auxiliary shuttle 22 other than a mechanism for maintaining the auxiliary shuttle 22 in engagement with the main shuttle 12. With reference to FIGURES 2 and 3, the front face of the auxiliary shuttle head 24 is provided with a pair of forwardly extending keys 100 which fit within cooperating slots in the confronting forward face of the main shuttle head 32. The arrangement of the keys 100 and the cooperating slots is such that the axis of the pins 26 and 34 are maintained in parallel relation and the pins 26 and 34 are contiguous when the auxiliary shuttle 22 is placed into operation. As apparent, the interfitting surface portions of the main and auxiliary shuttle heads 24 and 32 prevent relative rotation thereof. Thus, upon oscillation of the main shuttle 12 the auxiliary shuttle 22 will oscillate.

In the full line position of FIGURE 1, the auxiliary shuttle 22 is shown spaced from the main shuttle 12. The spacing of the auxiliary shuttle 22 is maintained by a disengaging air cylinder 102 mounted upon a bracket 104 and having a piston rod 106 to which a fixture 108 having a drive roller 110 is connected. A conventional guide assembly 111 maintains the fixture 108 and drive roller 110 in the orientation shown in FIGURE 1. The drive roller 110 is engaged with an abutment flange 112 upon an operating rod 114 which is connected at its upper end by a plate 115 and rigid link 116 to a drive pin 118 fixed in a driving member 120 mounted by a bearing assembly 121 (FIGURE 5) for rotation upon a mid-portion of the auxiliary spindle 30. The operating rod 114 includes a sleeve portion 122 at its lower end mounted for rotation upon a shaft 124 affixed by a bracket 126 to a support plate 127 mounted upon the frame piece 86 and the brace 92. In FIGURE 1 the piston rod 106 is shown extended from the air cylinder 102 whereupon the operating rod 114 is pivoted in its extreme counterclockwise position and, because of the connection of the rigid link 116 to the drive pin 118, the auxiliary shuttle 22 is moved to its extreme left position as viewed in FIGURE 1 and hence is disengaged from the main shuttle 12.

The lowermost end of the operating rod 114 is connected by a yoke 128 to a piston rod 130 of a compound air actuator 132. The compound air actuator 132 serves as an air spring or damper biasing the operating rod 114 in a clockwise direction. Accordingly, upon retraction of the piston rod 106 by operation of the disengage cylinder 102, the operating rod 114 will be moved in a clockwise direction, as viewed in FIGURE 1, causing the auxiliary shuttle head 24 to engage the main shuttle head 32 as illustrated in FIGURE 2. Sufficient air pressure is maintained on the actuator or air spring 132 so as to maintain this interfitting relationship of the shuttle heads 24 and 32. Accordingly, the auxiliary shuttle 22 will reciprocate with the main shuttle 12 between the positions indicated by the arrow 134, the broken line positions of the operating rod 114 designated 114a and 114b, and the broken line positions of the auxiliary shuttle head designated 24a and 24b. The paths of the auxiliary wire outlets 28 will, therefore, follow substantially the paths of the main shuttle wire outlets 36. It will be noted that the rigid link 116 has an adjustable length and is pivotally mounted both to the drive pin 118 and to the plate 115 on top of the operating rod 114. The length of the link 116 is adjusted such that it drives the pin 118 in a straight line although the top of the operating rod 114, of course, will be following a slightly arcuate path in its operating range. To avoid looseness in the drive of the driving member 120, a guide pin 136 (FIGURES 1 and 5) projects upwardly therefrom into the slot formed between the two guide plates 74.

The auxiliary shuttle head 24 and the main shuttle head 32 are brought together at a time when the main shuttle 22 is farthest extended from the front face of the machine 10. This position is indicated in FIGURE 1 by the broken line illustration of the respective shuttle heads at 24a and 32a. At this position the shuttle pins 26 and 34 are vertical. To maintain the appropriate vertical position of the auxiliary shuttle head 24 when disengaged from the shuttle head 32, an aligning plate 140 having a V-shaped notch or groove in its forward face depends from a carriage 142 (FIGURES 1 and 5) slidably mounted upon the guide plates 74. The carriage 142 includes a top plate 144 having a slot 146 therein extending throughout substantially its entire length. A coil spring 148 is connected at one end to a stud 150 on the carriage top plate 144 and at its other end to a stud 152 passing through the slot 144 and mounted on a fixed plate 154 projecting horizontally from the main frame piece 86. The coil spring 148 biases the carriage 142 and, accordingly, the aligning plate 140 to the right, as viewed in FIGURE 2, whereby the groove or notch in the front face of the aligning plate 140 engages the uppermost auxiliary shuttle pin 26 to retain the auxiliary shuttle head 24 in the proper position to engage the main shuttle head 32. The travel of the carriage 142 to the right as viewed in FIGURE 1 is limited by a suitable stop (not shown) to prevent the aligning plate 140 from interfering with the operation of the auxiliary shuttle 22 when it is engaged with the main shuttle 12.

From the foregoing, it will be appreciated that the auxiliary shuttle 22 and the associated supporting framework and operating mechanism may be used with a variety of stator winding machines. Frequently, the only modification of the basic winding machine required would reside in the provision of slots or the like in the main shuttle head to interfit with the auxiliary shuttle head 24. Of course, a free path will be required for travel of the auxiliary shuttle 12 toward and away from the main shuttle. Therefore, the basic machine must be provided with suitable holders for the stator frames or cores and winding forms, if used, to permit unhampered movement of the auxiliary shuttle 22. Because the oscillatory and reciprocatory movement of the auxiliary shuttle 22 is derived directly from the shuttle on the basic machine, it will be appreciated that the auxiliary mechanism described herein can be used with a variety of shuttle machines. Also, it will be appreciated that conventional timing controls for operation of the disengage cylinder 102 are employed to permit the auxiliary shuttle 22 to wind coils having the same number of turns as the coils wound by the main shuttle 12, or any lesser number of turns.

As well known to those skilled in the art, when initiating the wind of coils by the main shuttle 12, the free ends of the wire strands 50 must first be tied down. Similarly, the free ends of the wire strands 56 must be tied down before the auxiliary shuttle 22 is placed into operation. After termination of the winding cycle, the wires leading from the wound coils are cut. Devices for tying down and cutting the start and finish portions of the wire strands are entirely conventional and are not described or illustrated herein. Such mechanisms for the auxiliary shuttle 22 may, for example, be mounted upon projections 156 extending from a plate 158 supported by the main frame piece 86. An advantage of the system described herein is that the start and finish wires for the coils wound by the main shuttle 12 will be on the opposite side of the completed stator assembly from the corresponding wires for coils wound by the auxiliary shuttle 22. The wires will be conveniently separated and identified, and, therefore, the subsequent handling of the stators is simplified.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. For use with a stator winding machine of the type utilizing a main shuttle having a wire outlet driven along a predetermined path to wind a coil or coils of wire onto a stator core, an auxiliary shuttle having a wire outlet, support means reciprocably supporting said auxiliary shuttle for movement with and adjacent said main shuttle and in a position wherein said wire outlet of said auxiliary shuttle may follow substantially the path of said wire outlet of said main shuttle, and selectively operable means releasably operatively connecting said auxiliary shuttle to said main shuttle for simultaneously winding an additional coil or coils onto said stator core.

2. The structure of claim 1 wherein said support means support said auxiliary shuttle for both reciprocal and oscillatory movements, said auxiliary shuttle and said main shuttle have interfitting surface portions for preventing relative rotation therebetween and wherein said selectively operable means includes bias means maintaining said interfitting surface portions mutually engaged.

3. The structure of claim 2 wherein said selectively operable means further includes means operative to disengage said auxiliary shuttle from said main shuttle when only the main shuttle is to be operative to wind coils.

4. The structure of claim 2 wherein said selectively operable means further includes an operating arm connected to said auxiliary shuttle and pivotally mounted on said support means, and wherein said bias means is connected to said operating arm.

5. The structure of claim 4 wherein said selectively operable means further includes means engaged with and moving said operating arm for disengaging said auxiliary shuttle from said main shuttle when only the main shuttle is to be operative to wind coils.

6. For use with a stator winding machine of the type having a main shuttle reciprocated and oscillated about a predetermined axis to wind a field coil, apparatus for simultaneously winding an additional field coil comprising an auxiliary shuttle, means mounting said auxiliary shuttle for reciprocatory and oscillatory movement along and about said predetermined axis, and means operatively connecting said auxiliary shuttle to said main shuttle for at least a portion of the winding cycle.

7. The apparatus of claim 6 wherein said main shuttle and said auxiliary shuttle have interfitting surface portions preventing relative oscillatory movement therebetween during said portion of the winding cycle.

8. The apparatus of claim 7 wherein said means operatively connecting said auxiliary shuttle to said main shuttle includes an air spring operatively connected to said auxiliary shuttle and biasing said auxiliary shuttle into engagement with said main shuttle.

9. For use with a stator winding machine of the type having a shuttle reciprocated and oscillated about a predetermined axis, an adapter comprising an auxiliary shuttle, means mounting said auxiliary shuttle in confronting relation to said first mentioned shuttle for reciprocatory and oscillatory movement therewith, means biasing said auxiliary shuttle into engagement with said first mentioned shuttle, said first mentioned shuttle and said auxiliary shuttle having interfitting surface portions preventing relative oscillatory movement therebetween whereby said auxiliary shuttle reciprocates and oscillates with said main shuttle, and means for disengaging said auxiliary shuttle from said first mentioned shuttle.

10. For use with a stator winding machine of the type having a main shuttle reciprocated and oscillated about a predetermined axis whereby wires emerging from a wire outlet on said main shuttle form a field coil, apparatus for winding an additional coil comprising an auxiliary shuttle having a wire outlet, means mounting said auxiliary shuttle for reciprocatory and oscillatory movement along and about said predetermined axis, and means maintaining said wire outlet of said auxiliary shuttle adjacent said wire outlet of said main shuttle.

References Cited

UNITED STATES PATENTS

| | | | |
|---|---|---|---|
| 1,612,026 | 12/1926 | Jannell | 242—1.1 |
| 2,304,520 | 12/1942 | Wirtz et al. | 242—1.1 |
| 3,052,418 | 9/1962 | Gorski et al. | 242—1.1 |

BILLY S. TAYLOR, *Primary Examiner.*